April 5, 1932. E. P. EVERETT 1,852,451
METHOD AND APPARATUS FOR MAKING LAMINATED FIBROUS BLANKS
Filed Sept. 15, 1926 3 Sheets-Sheet 1
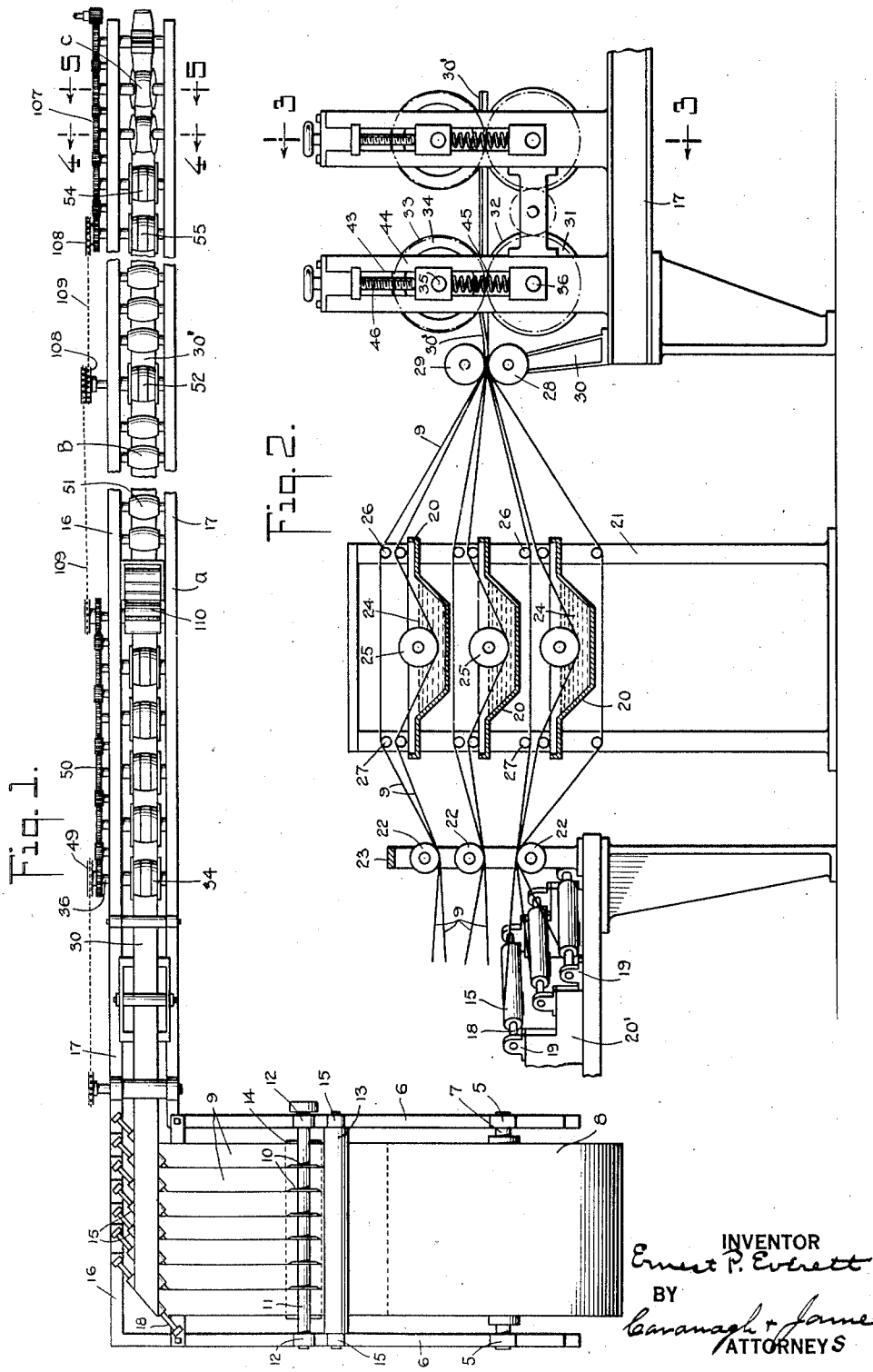
INVENTOR
Ernest P. Everett
BY
Cavanagh + James
ATTORNEYS

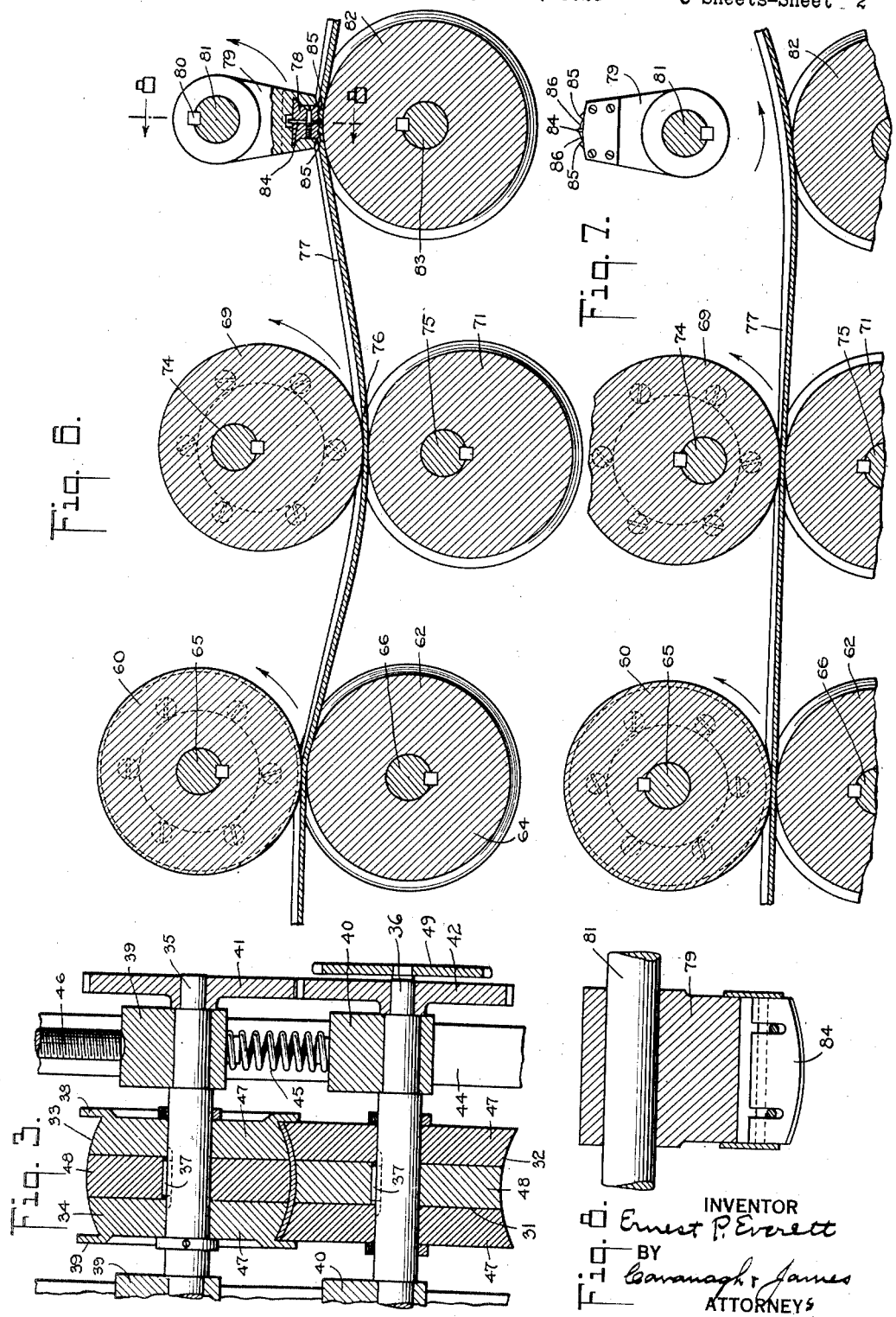

April 5, 1932.    E. P. EVERETT    1,852,451
METHOD AND APPARATUS FOR MAKING LAMINATED FIBROUS BLANKS
Filed Sept. 15, 1926    3 Sheets-Sheet 3
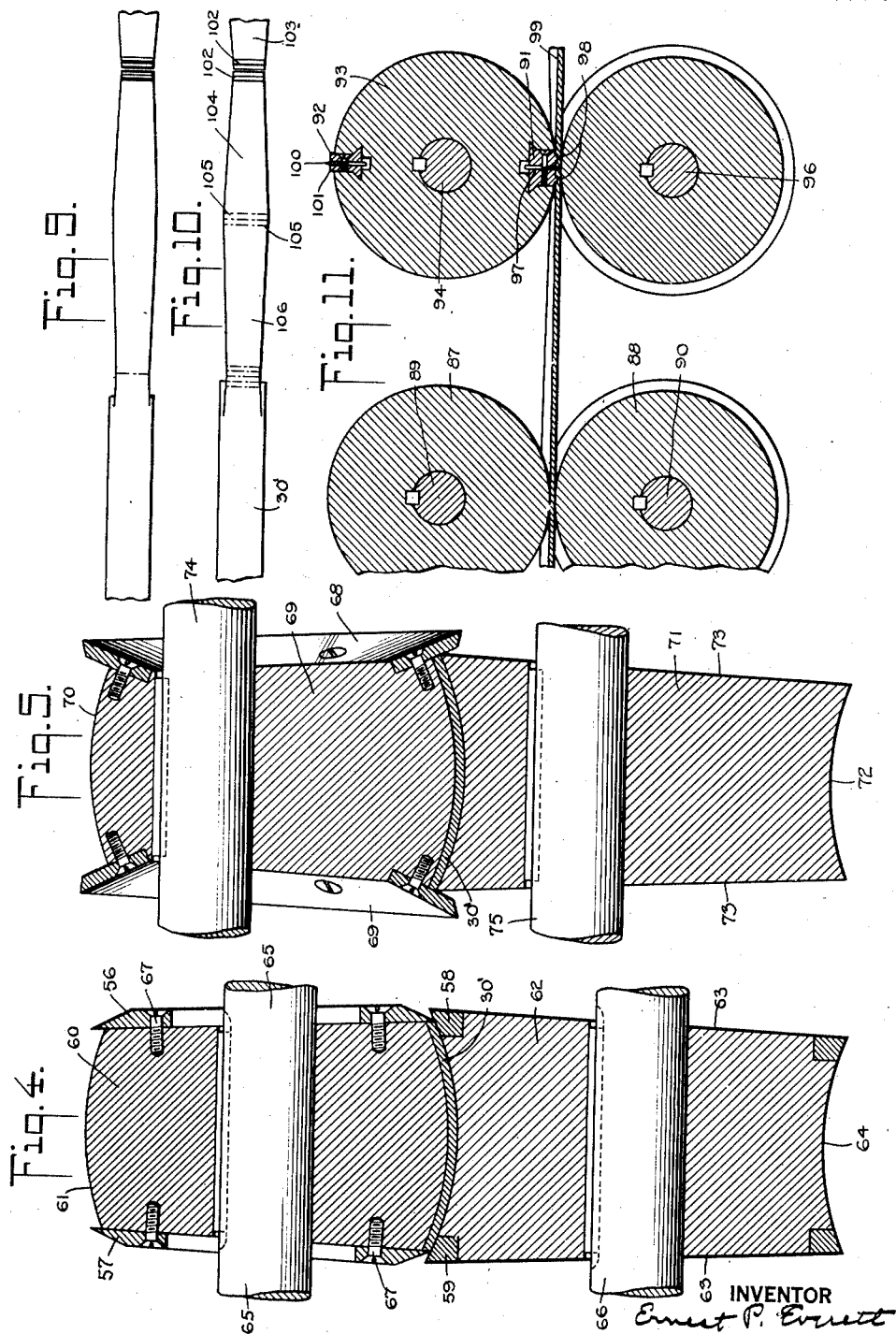

Patented Apr. 5, 1932

1,852,451

UNITED STATES PATENT OFFICE

ERNEST P. EVERETT, OF YONKERS, NEW YORK

METHOD AND APPARATUS FOR MAKING LAMINATED FIBROUS BLANKS

Application filed September 15, 1926. Serial No. 135,511.

The present invention relates to a method of and apparatus for the making of blanks of fibrous material, and has particular application to the formation of laminated fibrous blanks used in connection with the manufacture of staves for barrels, tubs and the like.

The present invention in particular proposes to simplify and at the same time expedite the method of continuously producing a laminated blank with an adhesive between the layers thereof and continuously applying pressure by feeding the blank as produced between pressure rolls and finally cutting pressed sections of predetermined lengths from the blank simultaneously with the movement thereof between the rolls. In connection with the present invention it is further proposed to provide a novel die construction for shaping and trimming the blank, and which die or dies is or are adapted to operate continuously upon the laminated blank as the same is formed.

In view of the foregoing, the general object of the present invention is to provide for the making of finished laminated blanks of fibrous material in a cheap, effective and expeditious manner.

The above and other objects are accomplished by instrumentalities and steps pointed out in the following specification.

The invention is clearly defined in the claims.

A satisfactory embodiment of the apparatus as constructed for making a laminated blank is illustrated in the accompanying drawings forming part of the specification and in which:

Fig. 1 is a contracted plan view of one embodiment of machine used in connection with the present invention.

Fig. 2 is an enlarged side elevation, partly in section showing the deflecting rolls for the layers of fibrous material together with the adhesive coating apparatus and the blank forming apparatus.

Fig. 3 is an enlarged detail cross section approximately on the line 3—3 of Fig. 2 looking in the direction of the arrows.

Fig. 4 is an enlarged detail vertical cross section of the side trimming rolls and taken approximately on the line 4—4 of Figure 1 and looking in the direction of the arrows.

Fig. 5 is a view similar to Fig. 4 and taken on the line 5—5 of Fig. 1 and showing the construction of the combined beveling and bilge rolls.

Fig. 6 is a detail transverse section showing the trimming and bilge rolls together with the cut-off knife and croze die when the parts are positioned for bilging and crozing a barrel stave.

Fig. 7 is a view similar to Fig. 6 and showing the positions of the same parts after the bilge and croze have been formed in a stave.

Fig. 8 is a detail of vertical cross section cut-off knife taken on the line 8—8 of Fig. 6.

Fig. 9 is a fragmentary plan view of the blank of this invention showing one end portion thereof partly formed into a barrel stave and further showing an end portion of a finished barrel stave removed from the blank.

Fig. 10 is a view similar to Fig. 9 but showing the modified end portions of the blank shaped so as to provide tub staves.

Fig. 11 is a vertical cross section of the rolls, dies and cutters for forming the tub staves of Fig. 10.

In the embodiment of the present invention as shown in the drawings, A indicates a suitable upright frame adapted in any preferred manner for supporting the various elements hereinafter described. The contour of frame A is preferably right angular in plan view. This construction, although not absolutely essential, requires a relatively short length of floor space to accommodate the machine. Suitable bearings 5—5 are provided in the side portions 6 of the frame for the end portions of a horizontally disposed shaft 7 of a roll of paper or other fibrous material 8 which is insertable through the open end of side portion 6 and between the side members thereof. The sheet which makes up the roll 8 is cut into a plurality of symmetrical layers 9 by a series of spaced circular cutters or knives 10, secured to a power driven shaft 11 which is mounted in bearings 12 in the side members of side portion 6 inwardly and beyond the axis of roll 8. Each of the layers 9 corresponds approximately in width to the width of the laminated blank to be formed and the whole number of layers cut by knives 10 corresponds to the number of layers required for the blank to be formed. It is therefore to be noted that waste of material is avoided by providing a sheet of predetermined width according to the width and number of layers required in the particular blank to be formed. An upper horizontally disposed roller 13 and a similarly disposed lower roller 14 are disposed for supporting the fibrous sheet of roll 8, in operative relation to knives 10, suitable bearings such as 15 being provided for roller 13 and similar bearings (not shown) are provided for roller 14. The layers 9 are arranged in a common horizontal plane upon moving away from knives 10 and until they approach the angularly disposed opposite side portion 16 of frame A at which time a change is made in the direction of progressive movement of the layers and also in their relative positions. These changes are effected by a deflector in the form of an inclined series of rolls 15, disposed with their axes oblique to the long axis of the side portion 16, of frame A. The layers are directed under and around the rolls 15 which, by reason of their arrangement in an inclined plane, operate to position the various layers, one above the other and direct the same between the side members 17, of side portion 16, of the frame.

As shown in Fig. 2 the end portions 18, of the rolls are journalled in bearings 19, secured to the stepped side plates 20'. For purposes of illustration, there is shown an arrangement for forming a laminated blank from 7 layers of fibrous material.

In this connection it is proposed to apply adhesive to the opposite faces of alternately disposed layers arranged between the uppermost and the lower-most layers with the result that when the layers are pressed together in superimposed relationship adhesive will coat adjacent faces of the layers but leave the outside faces, that is the top and bottom of the blank, uncoated. This proposal involves the use of a plurality of horizontally disposed trays 20, arranged in spaced relation, one above the other and suitably secured to upright 21, and arranged within the side portion 16 of the frame adjacent to the deflecting rollers 15. A plurality of guide rollers 22, are arranged one above the other in a frame 23, and disposed between the rolls 15, and the trays 20. The various layers 9, upon moving away from the rolls 15, are positioned in operative relation to their respective trays 20. Each of the trays 20, is adapted for containing a quantity of adhesive substance 24, and a roll 25, is disposed so as to be immersed in the adhesive 24, so that when one of the layers 9, is directed downwardly and under the said roll 25, the opposite faces of said layer are exposed to the adhesive and thereby coated. Small guide fingers 26 and 27, are arranged in pairs over the opposite end portions of each tray and are provided for guiding certain of the layers into and out of the trays and for guiding others of the layers across and out of contact with the trays, and further for permitting the convergence of the layers in moving away from the frame 21. The layers 9, at their points of convergence pass between a pair of horizontally disposed upper and lower rolls 28 and 29, which operate to combine initially the dry layers with those carrying coatings of adhesive.

A bracket-arm 30, or its equivalent is provided for supporting the combining rolls 28 and 29. The combined layers, upon moving away from the combining rolls 28 and 29, are formed into the laminated blank indicated by 30', in Figs. 1 and 2. The blank 30', may subsequently be operated upon to assume a variety of forms, depending upon its size and the ultimate use to be made thereof. The die or shaping mechanism for operating upon blank 30' is indicated generally by B and is located within the side portion 16, of frame A, extending throughout the side portion from a point adjacent to the combining rolls 28 and 29. In the present case and for purposes of illustration, I have shown the die mechanism B as being adapted in operating upon blank 30' to form the same into staves suitable for making barrels, tubs and the like. In this connection it is to be noted that each of the layers 9 which go to make up blank 30' is of a width corresponding to the width of the stave to be formed. The extreme end of mechanism B, adjacent to rolls 28 and 29, consists of a lower roll 31, having a concaved periphery 32, conforming to convex periphery 33, of an upper roll 34, arranged in alignment with roll 31. Horizontally disposed shafts 35 and 36, pass through the central portions of rolls 31 and 34, and operate to rotate the rolls by being keyed thereto, as indicated by 37. The transverse dimensions of the surfaces 32 and 33, conform to the width of blank 30' and these surfaces combine to impart the conventional concavo-convex cross sectional contour to the blank 30' as the same passes between rolls 31 and 34, in moving away from the combining rolls 28 and 29. Circular flanges 38 and 39, are provided for preventing lateral displacement of the blank as the same passes between the rolls, the flanges being carried by one set of rolls as, for instance, the roll 34. It is desirable that considerable pressure be applied to blank 30' in passing between rolls 31 and 34, in order to impart an element of stability to the transverse curvature of the blank as the same moves away from the rolls 31 and 34. A convenient construction for effecting this result is shown in Figs. 2 and 3, where it is to be noted that shafts 35 and 36, are mounted for rotation in oppositely disposed cross-heads 39 and 40, with the terminals of the shafts disposed in the upper and lower cross heads respectively, and connected for synchronous rotation by gears indicated by 41 and 42. The cross heads 39 and 40, are slidable in vertical guides 43, formed in oppositely disposed uprights, one of which is shown in Figs. 2 and 3 and indicated by 44. The compression springs, one of which is shown in Figs. 2 and 3 and indicated by 45, are interposed between boxes 39 and 40, on either end portions of shafts 35 and 36. The lower cross heads bear upon the lower ends of the guides and the adjusting screws, one of which is shown in Figs. 2 and 3 and indicated by 46, are screwed through the heads at the upper ends of uprights 44, so as to be turned into contact with the upper boxing 39, all of which is shown in Figs. 2 and 3. The springs 45, operate normally to yieldingly hold the upper roll 34, in spaced relation to the lower roll 31, so that by turning the screws 46, the space between said rolls may be diminished transversely and in accordance with the thickness of blank 30' to obtain the required degree of pressure upon the said blank. In that there may exist a tendency on the part of the rolls 31 and 33 to set up a differential in the rate of movement of the adjacent or remote portions of the blank in contact with said rolls, and this because of the pressure exerted by the rolls upon the blank and the presence of the curved surfaces of the rolls, it is proposed to overcome such tendency, when found to exist, by constructing the rolls 31 and 34 in sections, as shown in Figs. 1 and 3. In this connection it is to be noted that the end sections 47, of the rolls 31 and 34, are loose upon the respective shafts 35 and 36, and the intermediate sections 48, are keyed to the said shafts. This construction readily provides a means to compensate for any tendency to irregular movement in the different portions of the blank.

In Figs. 1 and 2 it is to be noted that additional upper and lower rolls, identical in construction with rolls 31 and 34, are provided to further carry out the operation of imparting the transverse curvature to the blank which is, as shown, directed between the various sets of upper and lower rolls. The number of these sets to be employed may vary with the type of blank to be operated upon, and this holds true, regardless as to whether the blank is to be shaped, as just described, or otherwise. In Fig. 1 it is to be noted that the rolls 31 and 34, which initially operate upon the blank, are power driven from a pulley 49, secured to shaft 36. Where a plurality of rolls are employed, as shown in Fig. 1, the same are connected by a gear train such as shown, or its equivalent, constructed so as to operate the rolls at corresponding speeds. Provision is made for having the additional rolls, where employed, exert pressure upon the blank in an amount corresponding to or different from the pressure initially exerted by rolls 31 and 34. The devices employed for producing the required pressure on the additional rolls are identical with those described in connection with screw 46, for rolls 31 and 34, all of which is shown in Fig. 2.

In some instances it may be found that the condition of the blank is such as to permit of the trimming and finishing thereof immediately after moving away from one or more pairs of the rolls 31 and 34, and in other instances it may be found necessary to delay slightly the trimming and finishing operations. Where such delay is necessary it is proposed to prevent change in the transverse curvature of the blank by directing the blank between a series 51, of upper convex rolls and lower concave rolls, located in the side portion 16, and outwardly beyond the series of pressure rolls. In Fig. 1, the convex upper rolls bear upon the lower concave rolls and are distinguished from the pressure rolls in that they are mounted as idlers in the frame and each of these rolls is formed of one piece as distinguished from the sectional construction of the pressure rolls 31 and 34. In some instances it may be found desirable to interpose a pair of pressure rolls, as indicated by 52 at a convenient location between adjacent pairs of rolls in the series of rolls 51. It may further be found desirable to apply additional pressure by means of pressure rolls 54 and 55, to the blank as same moves away from the series of rolls 51. In all instances, the employment of additional pressure rolls will, of course, depend largely, if not wholly, upon the type and size of blank to be operated upon.

When the blank moves away from the pressure rolls or series 51, or the supplemental pressure rolls 54 and 55, as the case may be, the said blank is directed between the dies of the finishing mechanism C. In the present instance this finishing mechanism includes first, a blank trimming and beveling die; second, a bilge-forming die; and third, a stave-cutting and crozing die,—so that the continuous blank as it approaches or enters the mechanism C, is first trimmed and beveled, then curved and bowed or bilged, and then finally cut into stave length and simultaneously crozed so as to form a complete stave.

The beveling and trimming die to which the blank strip of laminated fibre is fed is shown in detail in Fig. 4 and comprises a pair of oppositely sloped circular cutting blades 56 and 57 operating upon or in conjunction with oppositely sloping flanges 58 and 59. The circular blades 56 and 57 are disposed upon the ends of an upper roll 60 having a convex barrel 61 and the rings or flanges 58 and 59 are disposed at the ends of a lower roll 62 having sloped end surfaces 63 and a concave barrel 64. The roll 60 is keyed to a shaft 65 and horizontally supported thereon by the said portion 16 of the frame a. The roll 62 is keyed to a shaft 66 and is supported horizontally thereby in vertical alignment with the roll 60. The rolls 60 and 62 operate to support and convey the blank 30' as the same is beveled and trimmed by the cutting edges of the blades 56 and 57. It will be noted that the cutting edges of the blades 56 and 57 project beyond the periphery of the roll 60 and contact or work against the flanges 58 and 59. Therefore sufficient space is left between the roll 60 and the corresponding concave section of the roll 62 to permit the passage of the blank therebetween and at the same time to allow the free and unrestricted trimming and beveling of the edge. As the blank 30' passes between the trimming and beveling dies it will be cut, as indicated in general by Fig. 9—so far as the side edges of the blank are concerned.

Any suitable means, such as screws 67, may be employed for securing the blades to the roll 60. The rolls 60 and 62 operate at corresponding speeds and are so disposed with respect to the pressure rolls and to each other that the blank upon moving away from the pressure rolls enters directly between rolls 60 and 62 and moves for a distance equal to the length of the stave, shown in Fig. 9, in each revolution of the rolls 60 and 62. Immediately after moving away from the rolls 60 and 62 the blank with the longitudinal edges thereof trimmed, as shown in Figs. 9 and 10, and also beveled, enters between a pair of oppositely sloped bilge rolls 69—71 which are intended to bow or curve or bilge the trimmed and beveled stave blank. The upper roll 69, like the roll 60 previously mentioned, has a convex surface which works in a corresponding concave surface or barrel of the roll 71. The rolls 69 and 71 are keyed to shafts eccentrically disposed therein and respectively indicated by 74 and 75. These shafts are mounted in suitable bearings in the side portion 16 of frame A. The segment of the roll 69, farthest removed from the axis of the shaft 74, is disposed opposite to segment of the roll 71, nearest to the shaft 75. With this construction and when the blank is directed between the rolls 70 and 71, immediately upon moving away from the rolls 60 and 62, a continuous longitudinal curvature is imparted to the blank, as shown in Fig. 6. The central portion of this curvature forms the bilge, as indicated by 76, and in this connection it is to be noted that the lateral spacing between the axes of the rolls 60—69 and 62—71, conforms substantially to one-half the length of the stave to be formed and indicated in Fig. 6, by 77. A combined cut-off and croze die 78, is carried by a rotatable arm 79, keyed as at 80, to a horizontally disposed shaft 81, in the side portion 16, of frame A.

The axis of shaft 81, is spaced from the axis of the shaft 65 for a distance equal to the length of the stave 77. The said axis of the shaft 71, is also spaced from the axis of shaft 74 for a distance corresponding approximately to one-half the length of the stave 77. The end portion of the stave 77, after moving away from the rolls 69 and 71, is directed over a flanged roll 82, keyed to a shaft 83, which is transversely disposed in the side portion 16, of frame A and in vertical alignment with the shaft 81. In the turning movement of the arm 79, the blade 84 of the die 78, and the transverse ribs 85, disposed to either side of the blade 84, are turned into contact with the stave 77, as shown in Fig. 6, the knife operating to sever the blank forming the stave 77 and the ribs 85, operating to impress the adjacent ends of the severed portions and thereby form a croze in each. In this connection it is to be noted that the outer end of the die 78, disposed between the ribs 85 and knife 84, is bevelled, as at 86; these bevelled portions operating to bevel the adjacent ends of the severed portions so as to form the usual chimes.

In connection with the arrangement illustrated in Fig. 6, it is to be noted that the rolls 60, 62, 69, 71, 82 and arm 79, are of corresponding radii and the shafts of these elements rotate at corresponding speeds. Therefore, in each revolution the said rolls and arm operates to advance the blank 30', for a distance equal to the length of the stave 77 and in each revolution of the arm 79, one finished stave is severed from the blank and an end portion of the adjacent stave formed with the conventional chime and croze.

Fig. 7 shows the position occupied by the various rolls after one stave has been formed and before the same has been severed.

Fig. 9 shows a fragment of a finished stave and the adjacent end of the continuous blank with the free end thereof provided with a croze and chime.

Referring to the Fig. 11, it is to be noted that the rolls 87 and 88, are concentrically disposed upon their shafts 89 and 90. These rolls are constructed for and operate to trim and bevel the sides of the blank, as described in connection with the rolls 60 and 62 but said rolls, on account of their concentric arrangement with shafts 89 and 90, do not operate to impart a bilge and curve to the blank, as described in connection with the rolls 69 and 71. This construction is desirable in the making of tub staves, such as shown in Fig. 10. For purposes of illustration, I have shown a construction for making tub staves of substantially one-half the length of the stave 77, of Figs. 6 and 7.

In this connection there is provided a pair of oppositely disposed combined cut-off and croze dies, respectively indicated by 91 and 92. These dies are disposed in diametrically opposite portions of a roll 93, keyed to a transversely disposed shaft in the side portion 16, of the frame A, the said roll being disposed so as to permit the blank, after moving away from the rolls 87 and 88, to be directed thereunder and over a flanged roll 95, keyed to a transversely disposed shaft 96, arranged in the side portion 16 of the frame A, and in vertical alignment with the shaft 94. The die 91, has a cut-off blade 97, for severing the blank and a pair of transversely disposed ribs 98, for impressing the crozes in one end of the blank and the adjacent end of a finished stave 99, as the same is severed from the blank. The die 92 is provided with a blade 100, located between the plane surfaces 101, on the outer end of the die 92. The provision of these constructions in the dies 91 and 92, provides for the different end constructions found in tub staves; the die 91 operating to form a bottom receiving recess in the lower end of the stave in spaced relation to the lower edge while the die 92 operates to form the usual rabbet in the upper end portion of the stave.

The construction shown in Fig. 11 operates by first forming the bottom receiving recesses 102 and then severing the blank so as to provide the adjacent ends 103 and 104 and subsequently forming the top or cover receiving rabbets 105 and simultaneously severing the end portion 104 from the portion 106.

Although I have shown a construction and arrangement for trimming and shaping blank 30, so as to provide staves of different construction, it is to be understood that I am not to be limited to the specific construction and arrangement shown.

In some instances it may be found desirable to provide separate dies in separate rolls for crozing and cutting the blank.

Any suitable form of drive mechanism, such as a train of gears 107, may be employed for operating the trimming, bevelling and blank cutting dies, as shown in Fig. 1. This construction may be connected with the train indicated by 50, of the same figure, the power being transmitted through sprocket wheels 108 and chains 109, connected to the train 50, as shown.

In some instances it may be desirable to soften the inner face of the blank so that the croze and cutting of the blank may be made without distorting the fibrous material. For this purpose it is proposed to provide a rotary moistening device of ordinary construction and indicated generally by 110, the roller in the device operating to apply a fluid to the adjacent surface of the blank as the same moves away from the pressure rolls. The location of the moistening device may be such as is found desirable. In the present instance, the same is shown as located between the first series of pressure rolls on the left of Fig. 1, and adjacent to the series of idlers 51.

From the foregoing it is obvious that the embodiment illustrated is susceptible of various changes and I reserve the right to employ such changes as may come within the scope of the appended claims.

What I claim is:

1. The method of making a laminated blank of fibrous material which consists in continuously unwinding a rolled sheet of fibrous material, continuously cutting the sheet to provide a plurality of layers of corresponding widths, continuously arranging the layers with their flat faces in opposed relation, continuously applying a coating of adhesive to adjacent faces of the layers simultaneously, continuously superimposing the coated surfaces one upon the other and thereby forming a blank, and finally continuously trimming the longitudinal edges of the blank by feeding the same between the elements of a rotary cutting mechanism.

2. The method of making a laminated blank of fibrous material which consists in continuously unwinding a rolled sheet of fibrous material, continuously cutting the sheet to provide a plurality of layers of corresponding widths, continuously arranging the layers with their flat faces in opposed relation, continuously applying a coating of adhesive to adjacent faces of the layers simultaneously, continuously superimposing the coated surfaces one upon the other and thereby forming a blank, continuously trimming and beveling the longitudinal side edges of the blank by feeding the same between the elements of a cutting mechanism, and finally cutting a section of predetermined length from an end portion of the blank simultaneously with the movement of the blank between the elements of the cutting mechanism.

3. In a machine for making laminated fibrous blanks from a single sheet of fibrous material, a support for the fibrous sheet, a rotary cutting device adapted for continuously cutting the sheet into a plurality of layers of corresponding width, means for applying a coating of adhesive to adjacent faces of the layers simultaneously, and means for continuously moving the layers from the cutting device and into contact with the adhesive applying means, and means for continuously arranging the layers with their coated faces between the successive layers.

4. In a machine for making laminated fibrous blanks from a single sheet of fibrous material, a support for the fibrous sheet, a rotary cutting device adapted for continuously cutting the sheet into a plurality of layers of corresponding width, means for applying a coating of adhesive to adjacent faces of the layers simultaneously, and means for continuously moving the layers from the cutting device and into contact with the adhesive applying means, and means for continuously arranging the layers with their coated faces between the successive layers, together with means for continuously superimposing the one upon the other and pressing the layers to provide a blank.

5. In a machine for making laminated fibrous blanks from a single sheet of fibrous material, a support for the fibrous sheet, a rotary cutting device adapted for continuously cutting the sheet into a plurality of layers of corresponding width, means for applying a coating of adhesive to adjacent faces of the layers simultaneously, and means for continuously moving the layers from the cutting device and into contact with the adhesive applying means, means for continuously arranging the layers with their coated faces between the successive layers, together with means for continuously superimposing the layers one upon the other and pressing the layers to provide a blank, and means for continuously trimming and beveling the longitudinal side edges of the blank.

6. In a machine of the class described, rotary means for cutting a sheet into a plurality of layers and for applying adhesive to adjacent faces of the layers simultaneously and superimposing the layers one upon the other to provide a blank, pressure rolls adapted for continuously pressing the blank and adapted to impart a transverse curvature thereto, a cutting device for trimming the longitudinal edges of the blank as the same moves away from the pressure rolls, means for curving the blank longitudinally as the same is moved by the pressure rolls away from the cutting device, and means for intermittently cutting curved sections of predetermined length from the blank.

7. In a machine of the class described, rotary means for cutting a sheet into a plurality of layers and for applying adhesive to adjacent faces of the layers simultaneously and superimposing the layers one upon the other to provide a blank, pressure rolls adapted for continuously pressing the blank and adapted to impart a transverse curvature thereto, a cutting device for trimming the longitudinal edges of the blank as the same moves away from the pressure rolls, means for curving the blank longitudinally as the same is moved by the pressure rolls away from the cutting device, and means for intermittently cutting curved sections of predetermined length from the blank and impressing the said sections with transverse recesses.

8. In a machine of the class described, means for cutting a sheet into a plurality of layers and for applying adhesive to the layers and superimposing the layers one upon the other to provide a blank, pressure rolls adapted for continuously pressing the blank and imparting a transverse curvature thereto, a cutting device for trimming the longitudinal edges of the blank, and means for intermittently cutting sections of predetermined length from the blank.

9. In a machine of the class described, means for cutting a sheet into a plurality of layers and for applying adhesive to the layers and superimposing the layers one upon the other to provide a blank, a cutting device for trimming the longitudinal edges of the blank, means for curving the blank longitudinally as the same is moved away from the cutting device, and means for intermittently cutting sections of predetermined length from the blank.

10. In a machine of the class described, means for cutting a sheet into a plurality of layers and for applying adhesive to the layers and superimposing the layers one upon the other to provide a blank, pressure rolls adapted for continuously pressing the blank, a cutting device for trimming the longitudinal edges of the blank, and means for intermittently cutting sections of predetermined length from the blank and for impressing the said sections with a transverse recess.

11. The method of making a laminated barrel stave out of fibrous material, which includes continuously arranging layers of the fibrous material with their flat faces in opposed relation, continuously applying a coating of adhesive to adjacent faces of the layers simultaneously, continuously superimposing the layers and thereby forming a blank, and continuously trimming the longitudinal edges of the blank by feeding the same between the elements of a rotary cutting mechanism.

12. The method of making a laminated barrel stave out of fibrous material, which includes continuously arranging the layers with their flat faces in opposed relation, continuously applying a coating of adhesive to adjacent faces of the layers simultaneously, continuously superimposing the layers and thereby forming a blank, continuously trimming and beveling the longitudinal side edges of the blank by feeding the same between the elements of a cutting mechanism, and finally cutting a section of predetermined length from an end portion of the blank during the movement of the blank between the elements of the cutting mechanism.

13. In a machine for making laminated barrel staves out of fibrous material, means for applying a coating of adhesive to a plurality of layers of fibrous material, means for continuously superimposing the layers one upon the other and pressing the layers to form a barrel stave blank, and means for continuously trimming and beveling the longitudinal side edges of the blank.

14. In a machine for making laminated barrel staves out of fibrous material, means for applying adhesive to a plurality of layers of fibrous material, means for superimposing the layers to form a barrel stave blank, pressure rolls for continuously pressing the blank and imparting a transverse curvature thereto, a cutting device for trimming the longitudinal edges of the blank, and means for intermittently cutting sections of predetermined length from the blank.

15. In a machine for making laminated barrel staves out of fibrous material, means for applying adhesive to a plurality of layers of fibrous material, means for superimposing the layers one upon the other to provide a barrel stave blank, a cutting device for trimming the longitudinal edges of the blank, means for curving the blank longitudinally as the same is moved away from the cutting device, and means for intermittently cutting sections of predetermined length from the blank.

16. In a machine for making laminated barrel staves out of fibrous material, means for applying adhesive to a plurality of layers of fibrous material, means for superimposing the layers to form a barrel stave blank, pressure rolls for continuously pressing the blank and for imparting a transverse curvature thereto, a cutting device for trimming the longitudinal edges of the blank, means for curving the blank longitudinally as the same is moved away from the cutting device, and means for intermittently cutting sections of predetermined length from the blank.

17. In a machine for making laminated barrel staves out of fibrous material, means for applying adhesive to a plurality of layers of fibrous material and for superimposing the layers to form a barrel stave blank, pressure rolls for continuously pressing the blank, a cutting device for trimming the longitudinal edges of the blank, and means for intermittently cutting sections of predetermined length from the blank and for impressing the said sections with a transverse recess.

18. In a machine for making laminated barrel staves out of fibrous material, means for applying adhesive to a plurality of layers of fibrous material and for superimposing the layers to form a barrel stave blank, pressure rolls for continuously pressing the blank and for imparting a transverse curvature thereto, a cutting device for trimming the longitudinal edges of the blank, means for curving the blank longitudinally as the same is moved away from the cutting device, and means for intermittently cutting curved sections of predetermined length from the blank and for impressing the said sections with a transverse recess.

Signed at New York city, in the county of New York and State of New York, this 7th day of September A. D. 1926.

ERNEST P. EVERETT.